United States Patent [19]
Koelle

[11] Patent Number: 4,786,907
[45] Date of Patent: Nov. 22, 1988

[54] TRANSPONDER USEFUL IN A SYSTEM FOR IDENTIFYING OBJECTS

[75] Inventor: Alfred R. Koelle, Los Alamos, N. Mex.

[73] Assignee: Amtech Corporation, Santa Fe, N. Mex.

[21] Appl. No.: 885,250

[22] Filed: Jul. 14, 1986

[51] Int. Cl.[4] .............................................. G01S 9/56
[52] U.S. Cl. ......................................... 342/51; 342/44
[58] Field of Search .................................... 342/51, 44

[56] References Cited

U.S. PATENT DOCUMENTS

| | | | |
|---|---|---|---|
| 3,914,762 | 10/1975 | Klensch | 342/44 |
| 4,044,303 | 8/1977 | Reindel . | |
| 4,068,232 | 1/1978 | Meyers et al. | 342/51 X |
| 4,068,232 | 1/1978 | Meyers et al. . | |
| 4,069,472 | 1/1978 | Kamata et al. | 342/44 |
| 4,196,418 | 4/1980 | Kip et al. | 342/44 |
| 4,358,765 | 11/1982 | Henoch et al. | 342/51 |
| 4,658,263 | 4/1987 | Urbanski . | |

Primary Examiner—Thomas H. Tarcza
Assistant Examiner—John B. Sotomayor
Attorney, Agent, or Firm—Ellsworth R. Roston; Charles H. Schwartz

[57] ABSTRACT

A reader transmits interrogating rf signals to a transponder including an antenna having a particular impedance. The signals received by the antenna are converted to a direct voltage which is introduced to a first terminal of a switch such as an emitter of a semi-conductor device having conductive and non-conductive states of operation. A second terminal of the switch, such as the base of the semi-conductor device, receives a voltage variable between first and second magnitudes in accordance with a pattern of binary 1's and 0's in a data source such as a read-only memory (ROM). This pattern of binary 1's and 0's is individual to an object identified by the transponder. The variable voltage on the base of the semi-conductor device causes the emitter-collector current of the semi-conductor device to vary between first and second amplitudes. When this current has the first amplitude, the impedance of the semi-conductor device and the ROM substantially matches the antenna impedance. When this current has the second amplitude, the impedance of the semi-conductor device and the ROM is substantially greater than the antenna impedance. Capacitance may be connected to the collector of the semi-conductor device and the ROM to store energy in accordance with the current flow through the semi-conductor device. This stored energy provides for an energizing of the semi-conductor device and the ROM. A diode may be connected between the emitter and collector of the semi-conductor device to increase the second amplitude of the current through the semi-conductor device.

13 Claims, 1 Drawing Sheet

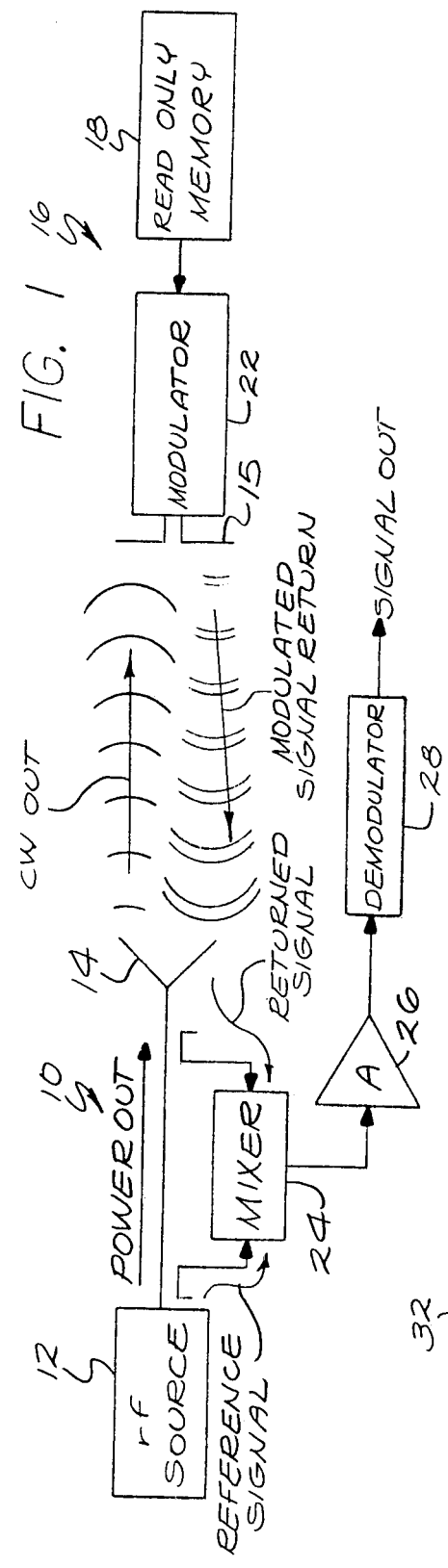
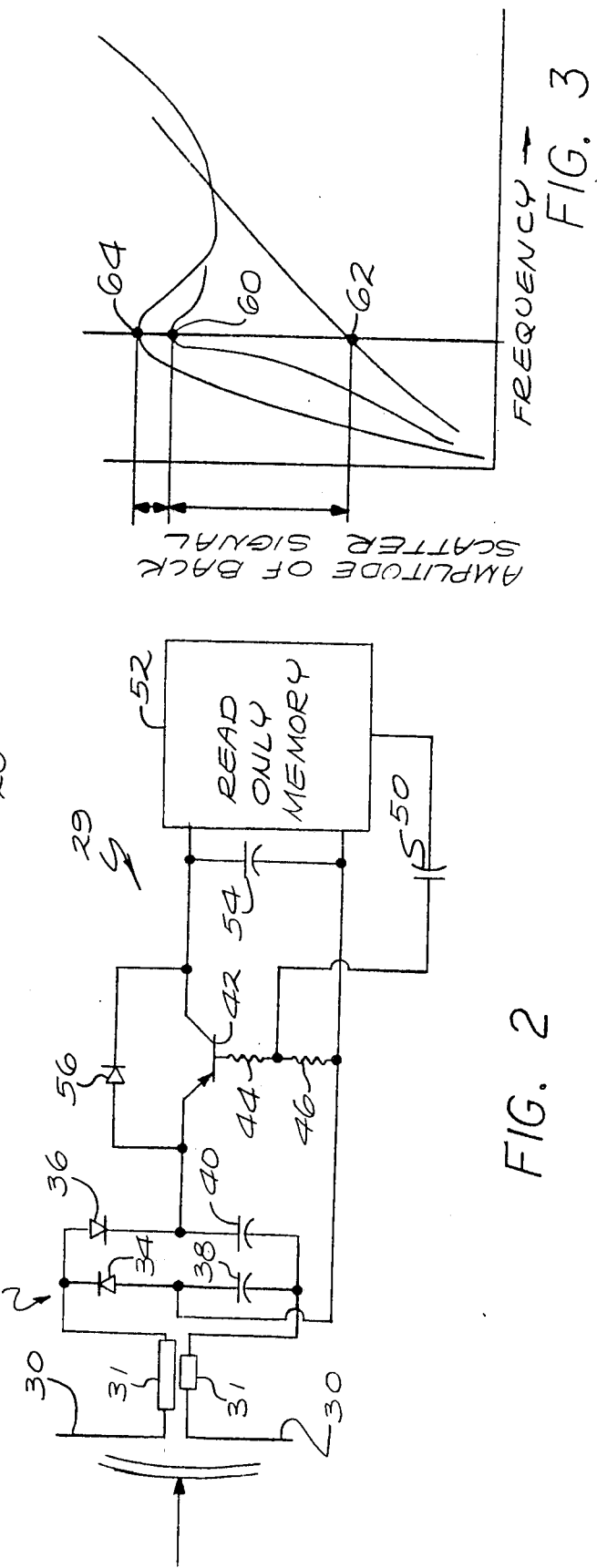

TRANSPONDER USEFUL IN A SYSTEM FOR IDENTIFYING OBJECTS

This invention relates to systems for identifying objects on a remote basis. More particularly, this invention relates to transponders in such systems for providing for an identification of goods through a greater distance and with more accuracy and reliability than in the prior art.

As commerce becomes increasingly complex, increased amounts of goods have had to be handled. The difficulties of identifying individual items of goods have accordingly become aggravated. For example, merchant ships now carry large numbers of containers holding different types of products. When the merchant ship reaches a particular destination, individual ones of such containers have to be unloaded at such destination port. Systems are now in use for identifying and segregating such individual containers without requiring a personal inspection of the containers. Such identification has been made by systems which provide such identifications at positions displaced from the containers.

The systems now in use employ a reader which transmits interrogating signals to a transponder associated with an individual one of the objects such as an individual one of the containers on the merchant ship. The transponder then transmits pluralities of signals to the displaced reader. The pluralities of signals are in a a sequence of binary 1's and binary signals in a code individual to the object. The reader decodes the successive pluralities of signals in the sequence to identify the object.

The systems now in use have had certain difficulties. One difficulty has resulted from the limited range of transmission of the identifying signals from the transponder to the reader. Another related difficulty has resulted from the interference produced by noise signals. These noise signals have often prevented the reader from properly detecting the pattern of binary 1's and binary 0's in the sequence individually identifying the object A considerable effort has been devoted over a significant number of years to eliminate or at least minimize the problems discussed in the previous paragraphs. In spite of such efforts, such problems have persisted. The range of communications between the reader and the transponder continues to be limited by the effects of noise. This has tended to limit the ranges of uses to which systems for identifying objects can be applied.

This invention provides a transponder which eliminates or at least minimizes the difficulties discussed above. The transponder of this invention provides an enhanced signal-to-noise ratio in comparison to the transponders of the prior art. As a result, the range of the effective distance of the transponder constituting this invention is considerably expanded relative to the transponders of the prior art.

In one embodiment of the invention, a reader transmits interrogating rf signals to a transponder including an antenna having a particular impedance. The signals received by the antenna are converted to a direct voltage which is introduced to a first terminal of a switch such as an emitter of a semi-conductor device having conductive and non-conductive states of operation.

A second terminal of the switch, such as the base of the semi-conductor device, receives a voltage variable between first and second magnitudes in accordance with a pattern of binary 1's and 0's in a data source such as a read-only memory (ROM). This pattern of binary 1's and 0's is individual to an object identified by the transponder. The variable voltage on the base of the semi-conductor device causes the emitter-collector current of the semi-conductor device to vary between first and second amplitudes. When this current has the first amplitude, the impedance of the semi-conductor device and the ROM substantially matches the antenna impedance. When this current has the second amplitude, the impedance of the semi-conductor device and the ROM is substantially greater than the antenna impedance.

A capacitance may be connected to the collector of the semi-conductor device and the ROM to store energy in accordance with the current flow through the semi-conductor device. This stored energy provides for an energizing of the semi-conductor device and the ROM. A diode may be connected between the emitter and the collector of the semi-conductor device to pass a limited amplitude of current around the semi-conductor device.

In the drawings:

FIG. 1 is a somewhat schematic diagram illustrating a system including a reader and a transponder for identifying at the reader an individual pattern of binary 1's and binary 0's identifying a displaced transponder;

FIG. 2 is a somewhat schematic block diagram of an improved transponder constituting one embodiment of this invention; and FIG. 3 is a curve somewhat schematically illustrating certain of the advantages of the transponder of this invention relative to the prior art in providing enhanced signal-to-noise ratios in the signals produced in the transponder and transmitted to the reader to identify the transponder.

In one embodiment of the invention, a reader generally indicated at 10 generates interrogating rf signals in a generator 12. These signals may have a suitable frequency such as approximately nine hundred and fifteen megahertz (915 MHz). These signals are introduced to an antenna 14 for transmission to an antenna 15 in a transponder generally indicated at 16. The antenna 15 may be a dipole antenna. The transponder 16 then produces pluralities of signal cycles in an individual pattern of binary 1's and binary 0's identifying an object with which the transponder is associated. The individual pattern of binary 1's and binary 0's may be generated in a suitable data source such as a read-only memory 18. This individual pattern of binary 1's and binary 0's generated in the read-only memory 18 causes pluralities of signal cycles to be produced in a modulator 22.

The modulator 22 produces a first plurality of signal cycles for a binary "1" and a second plurality of signal cycles for a binary "0". For example, in the system disclosed and claimed in copending application Ser. No. 885,248 filed by Jeremy Landt and Alfred R. Koelle on July 14, 1986, and assigned of record to the assignee of record of this application, a binary "0" is produced in the modulator 20 by providing a first signal cycle at a relatively low frequency such as twenty kilohertz (20 kHz) and then providing two additional signal cycle at a relatively high frequency, preferably a harmonic of the first frequency. This second frequency may be forty kilohertz (40 kHz) when the first frequency is twenty kilohertz (20 kHz). In like manner, a binary "1" may be produced in the modulator by signal cycles at the relatively high frequency such as forty kilohertz (40 kHz)

and then a single signal cycle at the relatively low frequency of twenty kilohertz (20 kHz).

The signal cycles produced in the modulator 22 are introduced to the antenna 15 for transmission to the reader 10. The reader 10 receives these signal cycles and mixes these signals in a mixer 24 with the signals from the source 12 of signals at the interrogating rf frequency. The mixed signals are amplified as at 26 and are demodulated as at 28 in accordance with the patterns of frequencies in each of the pluralities of signal cycles to obtain a recovery of the individual pattern of binary 1's and binary 0's generated at the transponder 16.

A simplified embodiment of a transponder constituting this invention is shown in FIG. 2. The transponder, generally indicated at 29, includes a dipole antenna 30 constructed to receive signals from the reader at a suitable frequency such as nine hundred and fifteen megahertz (915 MHz). An impedance matching section 31 is connected to the dipole 30 to match the impedance of the dipole to the impedance of the remaining circuitry shown in FIG. 2. The construction of the impedance matching section 31 is well known in the art.

The signals from the dipole 30 are introduced to a voltage-doubling rectifier generally indicated at 32. The voltage-doubling rectifier includes a pair of diodes 34 and 36 and a pair of capacitances 38 and 40 each having a suitable value such as 100 picofarads. The cathode of the diode 34 is connected to one leg of the dipole 30. The anode of the diode 34 is connected to one terminal of the capacitance 38, the other terminal of which has a common connection with the other leg of the dipole 30. The anode of the diode 36 is common with the cathode of the diode 34 and the cathode of the diode 36 has a common connection with one terminal of the capacitance 40. The other terminal of the capacitance 40 is connected to the other terminal of the dipole 30.

The anode of the diode 36 is connected to one terminal of a suitable switch. This terminal may constitute the emitter of a pnp-type of semi-conductor device such as a transistor 42. The semi-conductor device 42 may constitute a 2N3906. A pair of resistors 44 and 46 are in series between the base of the transistor 42 and the anode of the diode 34. The resistors 44 and 46 may respectively have values of 47 kilo-ohms and 100 kilo-ohms.

A capacitance 50 having a suitable value such as 0.01 microfarads is connected between a data sources such as a read-only memory 52 and the terminal common to the resistances 44 and 46. The read-only memory 52 may be constructed in a manner conventional in the prior art. Another terminal of the read-only memory has a common connection with the collector of the transistor 42. A capacitance 54 having a suitable value such as 0.2 microfarads is in parallel with the read-only memory 52. An anode of a diode 56 may be common at one end with the collector of the semi-conductor device 42 and at the opposite end with the emitter of the semi-conductor device. The diode may be a type 1N914.

When signals are received by the dipole 30 from the reader 10, the signals are introduced to the rectifier 32. The positive portions of the received signals cause current to flow through a circuit including the diode 36 and the capacitance 40. The negative portions of the signals cause current to flow through a circuit including the capacitance 38 and the diode 34. As a result, rectified voltages are produced in the capacitances 40 and 38. These rectified voltages are in an additive series relationship so that the rectifier 32 acts to produce a voltage which is approximately double the amplitude of the signals received by the dipole antenna 30.

The positive voltage on the cathode of the diode 36 is introduced to the emitter of the semi-conductor device 42 to bias the semi-conductor device to a state of conductivity. The semi-conductor device 42 accordingly becomes conductive when the voltage on the base of the semi-conductor device becomes negative relative to the voltage on the emitter of the semi-conductor device. The voltage on the base of the semi-conductor device 42 is controlled by the operation of the data source such as the read-only memory 52.

The read-only memory 52 produces pluralities of signal cycles, each plurality indicating in coded form the value of a different binary bit. For example, a binary "0" may be represented by a single signal cycle at a first frequency such as twenty kilohertz (20 kHz) and two subsequent signal cycles at a second frequency constituting a harmonic of the first frequency. Preferably, the second frequency is forty kilohertz (40 kHz) when the first frequency is twenty kilohertz (20 kHz). Similarly, a binary "1" may be represented by two signal cycles at the second frequency (e.g. 40 kHz) and then a single signal cycle at the first frequency (e.g. 20 KHz). The read-only memory 52 is programmed to provide a sequence of binary 1's and binary 0's in a code individual to an object with which the transponder 16 is associated.

The read-only memory 52 produces signals at first and second amplitudes in accordance with the frequencies of the pluralities of signal cycles coding for the successive binary bits in the code generated by the read-only memory. When the signals from the read-only memory 52 have a low amplitude, the semi-conductor device 42 becomes fully conductive so that a relatively large current flows through a circuit including the dipole 30, the impedance matching section 31, the diode 36, the emitter and collector of the semiconductor device 42, the capacitance 54 and the capacitance 38. This current is sufficiently large to produce a relatively low voltage drop across the semi-conductor 42. For example, this voltage drop may be in the order of 0.1 volts.

When the voltage introduced to the base of the semi-conductor device 42 from the read-only memory 52 is relatively high, the semi-conductor device 42 is driven toward a state of non-conductivity. However, the semi-conductor 42 device remains slightly conductive to provide a "leak-through" current through the semi-conductor device. This causes a relatively high impedance to be produced across the semi-conductor device 42. The "leak-through" current through the semi-conductor device 42 contributes to the production of a supply voltage across the capacitance 54.

When the semi-conductor device 42 is in the fully conductive state, its impedance is relatively low. This causes the circuit including the semi-conductor device 42 and the read-only memory 52 to provide an impedance approaching that provided by the dipole antenna 30 and the impedance matching section 31. This facilitates the production of currents of relatively high amplitude through this circuit. However, when the semi-conductor device 42 is only slightly conductive, its impedance is large. As will be appreciated, the resultant impedance of the semi-conductor device 42 and the read-only memory 52 is considerably greater than that provided by the dipole antenna 30 and the impedance matching section 31.

FIG. 3 illustrates the relationship between the "back scatter" signal and the frequency of the signals being generated by the system shown in FIG. 2. The "back scatter" signals are equivalent to the amplitudes of the signals introduced to the dipole antenna 30. In FIG. 3, a point 60 illustrates the amplitude of the signals introduced to the antenna when the semiconductor 42 is highly conductive. The amplitude of the signals introduced to the dipole antenna 30 is illustrated in FIG. 3 at 62 when the semi-conductor 42 is only slightly conductive. As will be seen, there is a considerable difference between the amplitudes 60 and 62. This is in contrast to the operation of the circuitry of the prior art since the circuitry of the prior art provides a short circuit in a first state of operation and provides the amplitude 60 in a second state of operation. The amplitude of the signal with the circuitry of the prior art in a short circuit condition is illustrated at 64. As will be seen, there is a relatively small difference between the amplitudes 60 and 64, particularly in comparison to the difference in the amplitudes 60 and 62.

Because of the considerable difference between the amplitudes 60 and 62, the strength of the signals transmitted by the dipole 30 to the reader 10 is considerably enhanced in relation to any noise received by the reader. As a result, the reader 10 is able to detect the signals from the transponder 29 through a greater distance than in the prior art. The reader 10 is also able to detect the signals from the transponder 29 with a greater reliability than in the prior art. This causes the reader 10 to identify the transponder 29 and its associated object through an increased distance and an enhanced reliability relative to the capabilities of the transponders of the prior art.

The ability of the reader 10 to detect the object is also enhanced because of other advantages provided by the transponder shown in FIG. 2. For example, approximately one tenth volt (0.1 V) is produced across the semi-conductive device 42 when the semi-conductive device is highly conductive. This is in contrast to the prior art which produces voltage drops as high as three tenths of a volt (0.3V). This difference is quite considerable in comparison to the voltage produced across the capacitance 54. This voltage may be in the order of one and eight tenths volts (1.8V). As a result, the voltage used to generate the transponder signals in the transponder shown in FIG. 2 and described above is significantly greater than the voltage used to generate such signal in the prior art.

The capacitance 54 has considerably higher values than the capacitances 38 and 40. The capacitance 54 accordingly serves as the primary source of energy for the read only memory 52 and the semi-conductor device 42. The capacitances 38 and 40 provide energy for the emitter-base current in the semi-conductor device 42. The capacitance 50 serves as a coupling capacitance between the read only memory 52 and the base of the semi-conductor device 42. The resistance 44 limits the current between the emitter and the base of the semi-conductor device 42. The resistance 46 provides an impedance between the coupling capacitance 50 and a reference potential such as ground.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for use in a transponder for sending signals to a reader to identify an object associated with the transponder, antenna means for receiving interrogating signals from the reader, the antenna having a particular impedance, means responsive to such received signals for storing energy, switching means having first and second states of operation and having a low impedance in the first state of operation and a high impedance in the second state of operation, the switching means including a semi-conductor having first, second and third electrodes, a data source for providing a sequence of binary indications individual identifying the object, the first and third electrodes of the semi-conductor being connected between the energy storing means and the data source, means including the data source and the switching means for defining a load, with the switching means having an impedance in the first state of operation corresponding to the impedance of the antenna means and having an impedance in the second state of operation considerably higher than the impedance of the antenna means, and means responsive to the sequence of binary indications in the data source for introducing the sequence of binary indications to the second electrode of the semi-conductor to obtain the operation of the switching means in the first and second states of operation in accordance with the sequence of binary indications individually identifying the object.

2. In a combination as set forth in claim 1, the switching means being connected in series with the data source and the antenna means.

3. In a combination as set forth in claim 1, means connected across the switching means to pass a limited flow of current around the switching means in the second state of operation of the switching means.

4. In a combination as set forth in claim 3, the storage means being connected to the switching means to receive energy in the first and second state of operation of the switching means for operating the data source to provide the sequence of binary indications individually identifying the object.

5. In combination for use in a transponder for sending signals to a reader to identify an object associated with the transponder, antenna means for receiving interrogating signals from the reader and for transmitting to the reader signals in a pattern to identify the object, rectifier means connected to the antenna means for storing energy received by the antenna means, a semi-conductor having a base, an emitter and a collector and having first and second states of operation and operative in the first state to provide a low impedance and operative in the second state to provide a high impedance, means for introducing the voltage from the rectifier means to the emitter of the semi-conductor, a data source constructed to provide a sequence of signal cycles coding for binary 1's and binary 0's in an individual pattern identifying the object, means for introducing the signal cycles in the sequence from the data source to the base of the semi-conductor to obtain an operation of the semi-conductor in the first and second states in accordance with the sequence of signal cycles coding for the binary 1's and binary 0's in the individual pattern identifying the object, and means connected to the collector of the semi-conductor for providing for a flow of current through the semi-conductor between the emitter and the collector of the semi-conductor in accordance with the sequence of the signal cycle introduced to the base of the semi-conductor.

6. In a combination as set forth in claim 5, the antenna means having a particular impedance and the semi-conductor and the means, including the data source, connected to the semi-conductor providing an impedance substantially corresponding to the particularly impedance in the first state of operation of the semi-conductor and providing an impedance considerably higher than the particular impedance in the second state of operation of the semi-conductor.

7. In a combination as set forth in claim 6, means connected between the collector and the base of the semi-conductor for receiving energy from the current flowing through the semi-conductor in the first and second states of operation of the semi-conductor to facilitate the flow of current through the semi-conductor.

8. In a combination as set forth in claim 6, means connected to the collector of the semi-conductor for receiving energy from the flow of current through the semi-conductor to energize the data source.

9. In combination for use in a transponder for sending signals to a reader to identify an object associated with the transponder, means for receiving interrogating rf signals from the reader and for sending to the reader the signals identifying the object, means responsive to the received signals for producing a voltage, semi-conductor switching means having first, second and third electrodes, the semi-conductor switching means having conductive and non-conductive states and having an impedance decreasing with increases in the amplitude of the current through the semi-conductor switching means, means responsive to the voltage produced by the receiving means for biasing the first electrode of the semi-conductor switching means to a state of conductivity, data source, means for providing a code of binary 1's and binary 0's individual to the object and for introducing, to the second electrode of the semi-conductor switching means, signals having first and second amplitudes in a pattern dependent upon the binary 1's and binary 0's provided in the data source means to obtain in the semi-conductor switching means the flow of currents at first and second amplitudes between the first and third electrodes of the semi-conductor switching means, and means operatively coupled to the data source means and the third electrode of the semi-conductor switching means for applying a voltage to the data source means to obtain the generation of the signals by the data source means and for applying a voltage to the third electrode of the semi-conductor switching means to obtain a flow of current between the first and third electrodes of the semi-conductor switching means in accordance with the generation of signals by the data source means.

10. In a combination as set forth in claim 9, the receiving means providing a particular impedance and the semi-conductor switching means and the read-only memory means providing the particular impedance with the first amplitude of the current through the semi-conductor switching means and the first amplitude of the current through the semi-conductor switching means being greater than the second amplitude of the current through the semi-conductor switching means.

11. In a combination as set forth in claim 9, a diode connected between the first and third electrodes of the semi-conductor switching means to limit the first amplitude of the current through the semi-conductor switching means.

12. In a combination as set forth in claim 10, means responsive to the flow of current through the semi-conductor switching means for storing energy to bias the third electrode of the semi-conductor switching means in a direction for producing a flow of current between the first and third electrodes of the semi-conductor switching means.

13. In a combination as set forth in claim 10, a diode connected between the first and third electrodes of the semi-conductor switching means to limit the first amplitude of the current through the semi-conductor switching means, and means responsive to the flow of current through the semi-conductor switching means for storing energy to bias the third electrode of the semi-conductor switching means in a direction for producing a flow of current between the first and third electrodes of the semi-conductor switching means.

* * * * *